June 19, 1951  B. SILVER  2,557,241

ANTISKID ATTACHMENT FOR DUAL WHEELS

Filed March 30, 1946

INVENTOR.
Boris Silver
BY
McMorrow, Berman & Davidson
ATTORNEYS

Patented June 19, 1951

2,557,241

UNITED STATES PATENT OFFICE 2,557,241

ANTISKID ATTACHMENT FOR DUAL WHEELS

Boris Silver, Brooklyn, N. Y.

Application March 30, 1948, Serial No. 17,887

2 Claims. (Cl. 152—220)

This invention relates to improvements in antiskid attachments for pneumatic tires, and more particularly to improved anti-skid attachments for the pneumatic tires of dual wheels.

It is among the objects of the invention to provide an improved anti-skid attachment which comprises a minimum number of simple parts, which may be quickly and easily attached to the dual wheels of trucks and similar vehicles, which is firmly secured in operative position on such wheels against displacement by forces exerted by the wheels, and which is strong, durable and economical in construction, easy to handle, and does not damage the tires or rims of the wheels to which it is applied.

Figure 1:
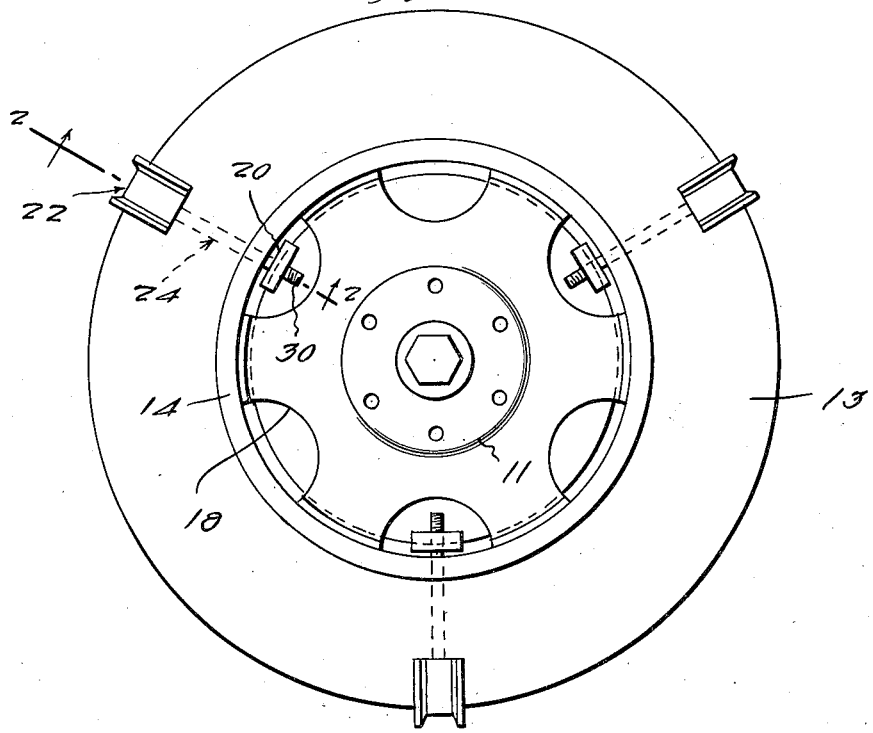
Figure 2:
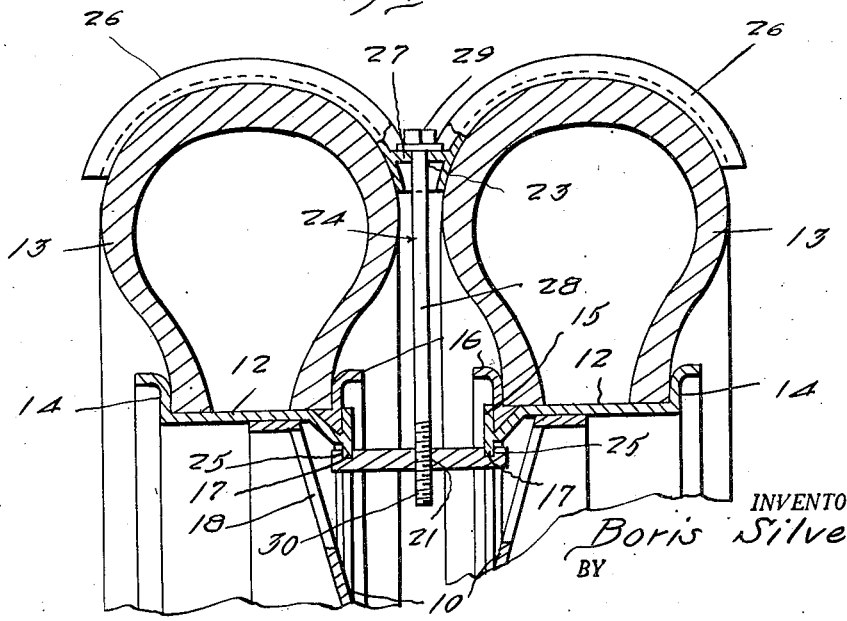

Other objects and advantages will become apparent from a consideration of the following description and appended claims in conjunction with the accompanying drawing, wherein:

Figure 1 is a vertical elevation of a dual vehicle wheel showing anti-skid attachments, illustrative of the invention, operatively applied thereto; and Figure 2 is a transverse cross-section on a somewhat enlarged scale on the line 2—2 of Figure 1, showing a fragmentary portion of the dual wheel with one of the anti-skid attachments operatively applied thereto.

With continued reference to the drawing, the dual wheel comprises a pair of webs 10 mounted on a hub structure 11 and each peripherally secured to a respective rim 12 and a pair of pneumatic tires 13 having their beads secured in the respective rims.

Each of the rims 12 has an integral flange 14 at its outer side, a groove flange 15 at its inner side and a separable ring 16 seated in the groove and providing a flange for the corresponding inner bead of the respective tire. Each of the inner flanges 15 projects inwardly of the rim to provide respective inner edges 17 and each web 10 is provided near its periphery with a plurality of angularly-spaced openings 18 through which a hand may be inserted to the space between the two wheels.

Each improved anti-skid attachment comprises a block, generally indicated at 20, having a screw-threaded aperture 21 therethrough, a cleat, generally indicated at 22, having an aperture 23 therethrough at its mid-length portion, and a bolt, generally indicated at 24.

Block 20 is a rectangular block of suitable metal having a thickness sufficient to provide an adequate length of screw threads for the bolt 24 and is provided with a pair of grooves 25, one near each end thereof, which grooves respectively receive the inner edge portions of the inner rim flanges 15 to firmly maintain the block 20 in operative position. The block 20 is inserted in operative position by passing it through an opening 18 in the web of the outer wheel and holding it in position with the inner edges of the inner rim flanges 15 seated in the grooves 25 while the remainder of the attachment is assembled therewith.

The cleat 82 comprises two curved portions 26 of channel cross-section shaped to fit about the treads of the tires 13 with the flat sides of the portions in contact with the tire treads. These portions are secured together at their inner ends and are provided with a reinforcing connecting structure 27 which is apertured for the passage of the bolt 24 therethrough, the cleat constituting a rigid structure adapted to extend transversely across the treads of both tires of a dual wheel.

The bolt 24 is conventional in construction, having a shank 28, a head 29 adapted to seat against the connecting structure 27 and an externally-screw-threaded end 30 opposite the head and threaded into the aperture 21 in block 20.

With the block 20 in seated position, as explained above, a cleat 22 is placed in operative position with the aperture 23 therein substantially in radial alignment with the aperture 21 in block 20, and a bolt 24 is then passed through the aperture in the cleat and threaded into the aperture in the block, this bolt being tightened until the cleat is firmly secured on the tire treads. It will be noted that the head 29 of the bolt is positioned radially inwardly of the outer portions of the cleat portions 26 so that the cleat may move inwardly to compensate for flexing of the tires as the wheel rotates without the head of the bolt coming into contact with the surface of the road supporting the wheels.

As many attachments may be used as desired, or as there are openings 18 in the outer web of the dual wheel. In the structure illustrated in Figure 1, three attachments are applied to the dual wheel, but as there are six openings 18, it is obvious that three more similar attachments may be operatively applied, if desired.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An anti-skid attachment for pneumatic-tired dual wheels comprising a block engageable with the inner edges of the wheel rims and having a screw-threaded aperture therethrough, a double cleat having two longitudinally-aligned portions adapted to extend over the tire treads of the dual wheel, said cleat having an aperture therethrough between the two tread-engaging portions thereof, and a bolt extendable through the aperture in said cleat and threadable into the aperture in said block to secure said cleat in operative position on the tire treads, said block having grooves therein, one near each end thereof, to receive the inner edges of the wheel rims and positively secure said block in operative position, and said bolt having a head bearing on the outer surface of said cleat.

2. In combination with a dual vehicle wheel having adjacent tire rims and pneumatic tires mounted one on each rim, an anti-skid attachment comprising a block having a screw threaded aperture therethrough and disposed against the inner sides of said rims with said aperture positioned between said rims, a cleat disposed against the tread portions of said tires and including curved portions fitting the tire treads and an apertured connecting portion disposed between said curved portions and securing the latter together in end to end relationship, said connecting portion being disposed inwardly of the tire treads, and a bolt extending through the aperture in the connecting portion of said cleat and threaded into the aperture in said block, said bolt having a head bearing on the side of said connecting portion remote from said block and constituting the sole means retaining said cleat and said block on the wheel.

BORIS SILVER.

REFERENCES CITED

The following references are of record in the file of this patent:

UNITED STATES PATENTS

| Number | Name | Date |
|---|---|---|
| 1,146,221 | White et al. | July 13, 1915 |
| 2,312,486 | Riesen | Mar. 2, 1943 |
| 2,473,782 | Boone | June 21, 1949 |